United States Patent

Hanson

[11] 3,820,628
[45] June 28, 1974

[54] SOUND SUPPRESSION MEANS FOR ROTATING MACHINERY

[75] Inventor: Donald B. Hanson, Rockville, Conn.
[73] Assignee: United Aircraft Corporation, East Hartford, Conn.
[22] Filed: Oct. 2, 1972
[21] Appl. No.: 294,400

[52] U.S. Cl...... 181/33 HC, 181/33 H, 181/33 HA, 181/33 HB, 244/42 CE
[51] Int. Cl. .............................................. E04b 1/99
[58] Field of Search ... 181/33 HA; 244/42 CE, 1 N, 244/42 C, 42 CF

[56] References Cited
UNITED STATES PATENTS

| | | | |
|---|---|---|---|
| 2,751,168 | 6/1956 | Stalker | 244/42 CE |
| 2,925,231 | 2/1960 | Pfaff, Jr. et al. | 244/42 CE |
| 3,097,817 | 6/1963 | Towzey, Jr. | 244/42 CE |

Primary Examiner—Richard B. Wilkinson
Assistant Examiner—Vit W. Miska
Attorney, Agent, or Firm—Norman Friedland

[57] ABSTRACT

Boundary layer control for flow splitters, blading (stator and rotor) in the air path of a ducted fan of an air propulsor serves to reduce noise by minimizing the wake promulgated thereby particularly when such appurtenances are upstream of a rotating body. The effectiveness of sound absorbing means is enhanced by flowing a portion of the air in the air path through the material or means utilized to absorb noise energy. For appurtenances that create wakes in the air path, the boundary layer control serves the dual function of removing strata of boundary layer and conducts air from the air path through the sound suppressing material or means.

6 Claims, 3 Drawing Figures

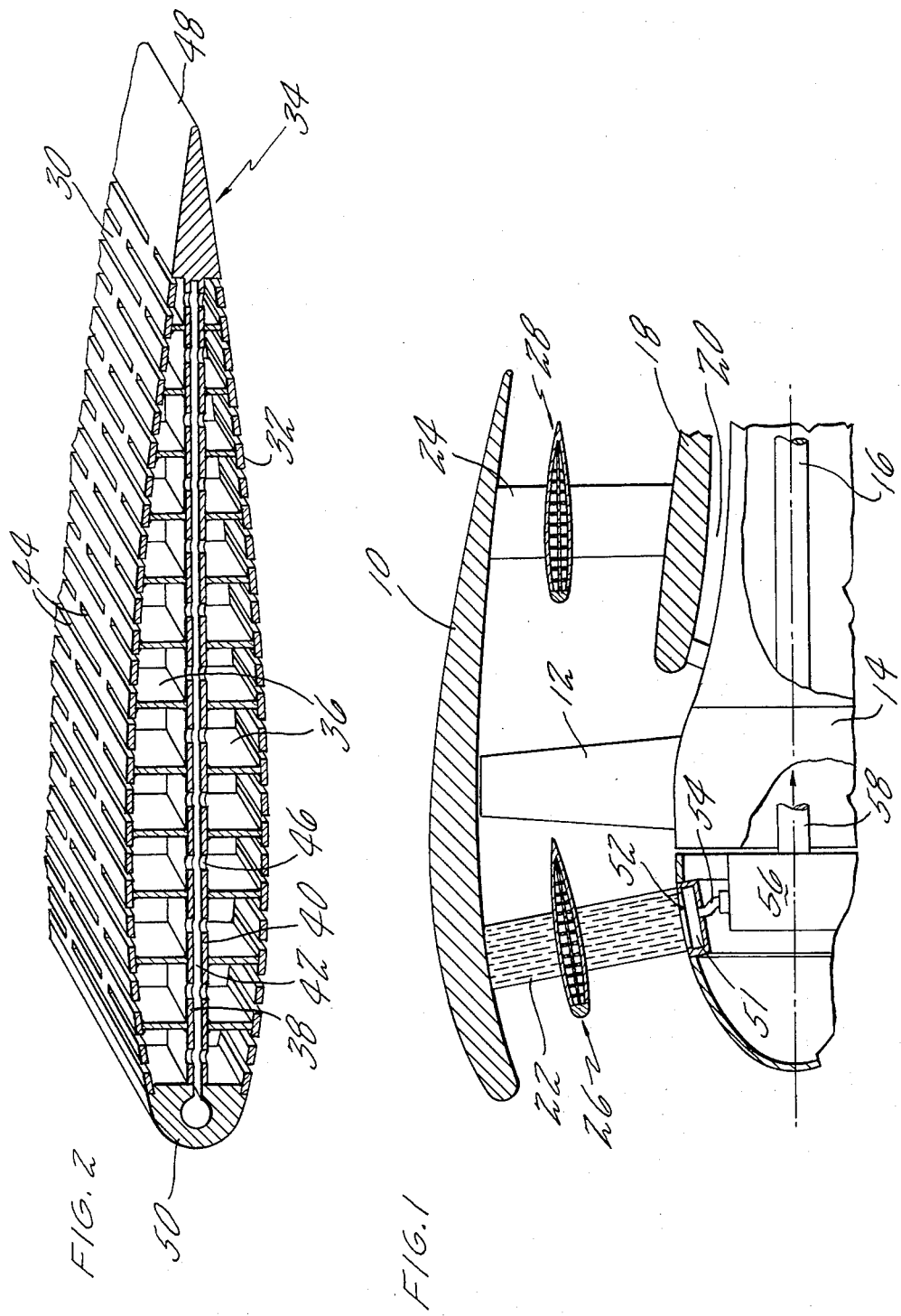

3,820,628

SOUND SUPPRESSION MEANS FOR ROTATING MACHINERY

BACKGROUND OF THE INVENTION

This invention relates to sound reduction and absorption means for reducing and suppressing the noise in the duct of a fixed or variable geometry ducted fan driven by a turbine type of power plant.

It is well known in the art that sound absorption material is used to line the inlet duct and blading of a turbojet or turbofan engine in order to suppress the noise generated within the duct as, for example, the type exemplified in U.S. Pat. No. 3,542,152 granted to Arthur P. Adamson et al. on Nov. 24, 1970. It is also well known in the art to utilize boundary layer control so as to remove strata of the boundary layers of air adjacent a surface in a flow passage in order to increase the effectiveness of that surface. As for example, boundary layer controls are well known for use on control surfaces of aircraft.

This invention utilizes boundary layer control in a ducted fan (variable or fixed pitch) to reduce the noise generated in the duct by the appurtenances coming into contact with the airstream such as flow splitters (with or without acoustic treatment), inlet guide vanes, fan blading, and the like by reducing the wake emanated thereby. Thus strata of the boundary layer in the duct adjacent the inlet guide vanes, outlet guide vanes, flow splitters, duct and/or fan communicate with openings formed therein and are led through the sound suppressing means by a suction pump so as to remove the boundary layer and thereby reduce the attendant wakes. The wakes impinging on downstream surfaces cause less noise because of their reduced strength. These appurtenances are designed to contain sound suppressing means and/or material and are disposed such that the strata of boundary layer removed is passed therethrough to further enhance the sound suppressing characteristics of the sound suppressing means.

SUMMARY OF THE INVENTION

It is an object of this invention to provide improved noise reduction and suppression means for ducted fan (variable or fixed pitch) propulsors.

A still further object of this invention is to provide boundary layer control and sound suppression means wherein the sound suppression means includes communicating passages leading the air removed from the boundary layer to a suction pump.

Other features and advantages will be apparent from the specification and claims and from the accompanying drawings which illustrate an embodiment of the invention.

BRIEF DESCRIPTION OF THE DRAWINGS

FIG. 1 is a partial view, partly in schematic, partly in elevation and partly in section illustrating the invention as applied to an aircraft propulsor.

FIG. 2 is a partial perspective view, partly in section showing an airfoil section acoustically treated and having means for boundary layer suction.

DESCRIPTION OF THE PREFERRED EMBODIMENT

Figure 3:
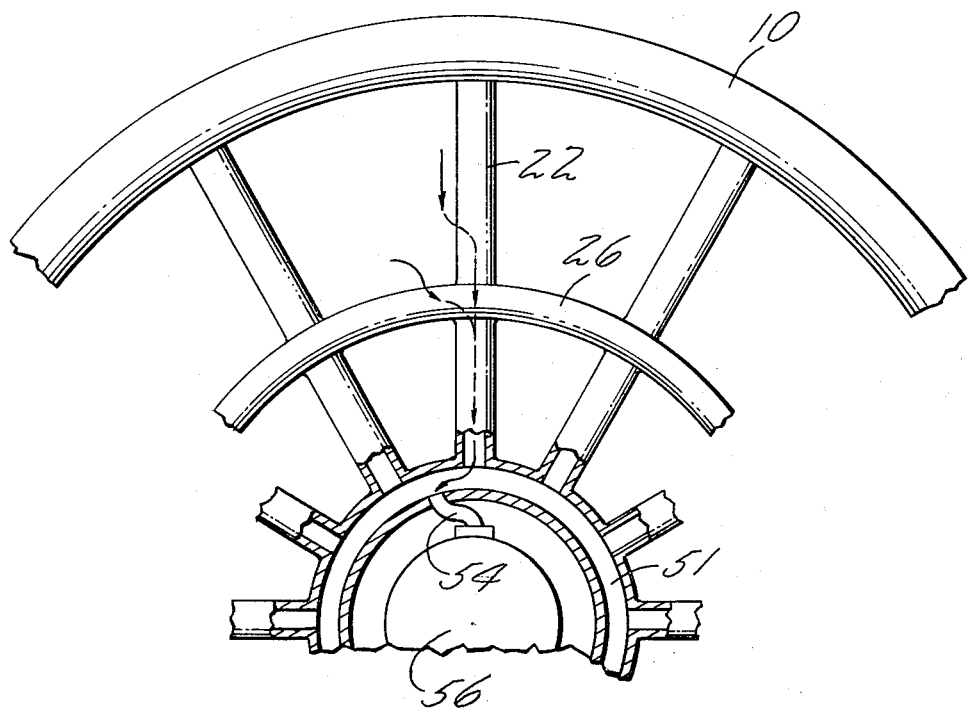
FIG. 3 is a front view partly in section taken along line 3—3 of FIG. 1 showing the section of the inlet guide vane 22, the annular splitter 26, the air inlet annular duct 10, and a central manifold 51.

While the preferred embodiment to which this invention is particularly applicable is a ducted fan propulsor for aircraft or high speed surface vehicles, it is to be understood that this invention has applications for other apparatus particularly where one member in the fluid stream is located upstream of another member. For purposes of describing the preferred embodiment of this invention, the ducted fan referred to in this description is representative by the Q-Fan$^{TM}$ manufactured by the Hamilton Standard Division of United Aircraft Corporation.

Referring to FIGS. 1 and 2, the propulsor comprises an air annular inlet duct 10 surrounding a plurality of rotary blades 12 which may be of the fixed or variable type supported in a hub 14 and driven by shaft 16. The shaft may be connected to a turbine type of power plant although any type of driving means is contemplated as being within the scope of this invention. Inner duct 18 which may be the engine casing is annularly spaced from shaft 16 and defines an air passage 20 for defining the inlet of the compressor section of a turbine type of power plant. Inlet guide vanes 22 disposed upstream of blade 12 and straightening or outlet guide vanes 24 are disposed downstream of blades 12 and are in the passageway defined by the inner duct 18 and duct 10 which is generally referred to as the bypass duct. Annular air splitters 26 and 28 are mounted on or made integral with the guide vanes 22 and 24 respectively and serve to reduce the noise generated by the air within the duct 10. Preferably, these splitters are acoustically treated so as to absorb noise energy.

The acoustic treatment, of course, would vary with every installation and for illustration purposes the splitters and inlet guide vanes are shown as being representative.

FIG. 2 represents the details of typical appurtenances that may be utilized with this invention. The vane, splitter or the like comprise upper face 30 and under face 32 being suitably contoured to define a suitable airfoil 34. The core comprises a plurality of cells designed to form acoustic chambers. The particular size of each cell 36 is predetermined by well known techniques in acoustics. It should be understood that this is merely one of many means for accomplishing noise suppression. For example, the core could be filled with a suitable noise suppression material such as fiber glass, or honeycomb or the like.

The inner wall 38 of the upper section and the inner wall 40 of the lower section of the airfoil 34 are spaced to define a manifold chamber 42 so that air passing over the upper and under faces 30 and 32 communicates therewith through slots 44 formed in the upper and lower faces 30 and 32. A plurality of openings 46 formed in both the upper and lower sections communicate the cells with manifold chamber 42, it being appreciated that only a single row of cells are shown in each of the sections of the airfoil and that each airfoil includes a multiple of similar rows of cells.

As can be seen in FIG. 3, the construction shown in FIG. 2 could be used for both the inlet guide vanes 22 and the annular splitter 26. In this case the boundary layer air on both the guide vanes and the splitters is drawn in through the aerodynamic surfaces and routed to the central suction pump 56 as shown by the dashed lines. The inlet guide vane manifold duct 42 lies in substantially a radial position. The inner end of manifold 42 is disposed in communication with collecting chamber 51 via opening 52 which is piped through line 54 to a suitable suction pump 56 shown in blank. The suction pump may be either coupled to shaft 16 or driven independently. A discharge passage 58 dumps the air overboard. In certain installations discharge air may be utilized for other purposes, such as cooling.

It should be understood that the invention is not limited to the particular embodiments shown and described herein, but that various changes and modifications may be made without departing from the spirit or scope of this novel concept as defined by the following claims.

I claim:

1. Means for reducing the noise propagated by an appurtenance disposed in a duct of an air propulsor where one member of said appurtenance extends in the air path of the duct forming a wake downstream thereof and being disposed upstream of another member of said appurtenance also extending in the air path of the duct, said one member being enclosed defining a cellular structure each cell being an acoustic chamber and having at least one surface over which the air passes, means for inducing a portion of the air in said duct to flow continuously in a given direction through openings formed in said surface and through said acoustic chambers so as to remove strata of boundary layer adjacent said surface and reduce the size of said wake for minimizing the generation of and for absorbing a portion of the generated noise.

2. Means as claimed in claim 1 wherein said means for inducing a portion of the air is a suction pump.

3. Means as claimed in claim 1 wherein said one member is inlet guide vanes having an airfoil section, slots in the airfoil section permitting boundary layer air adjacent said airfoil section to pass internally of said inlet guide vane.

4. Means as claimed in claim 3 wherein said other member is a rotating fan rotatable about an axis of rotation, a discharge passage in coincidence with said axis of rotation and connection means interconnecting said slots and said discharge passage.

5. In combination, means for reducing noise propagated by an appurtenance disposed in a duct of an air propulsor where one member of said appurtenance extends in the air path of the duct forming a wake downstream thereof and being disposed upstream of another member of said appurtenance also extending in the air path of the duct, and means for suppressing noise of said members, said one member being enclosed and having at least one surface over which the air passes, means for inducing a portion of the air in said duct to flow continuously in a given direction through openings formed in said surface so as to remove strata of boundary layer adjacent said surface and through acoustic chambers and reduce the size of said wake, sound suppression means adjacent said surface such that the air induced by said inducing means passes through said sound suppression means.

6. The combination as claimed in claim 5 wherein said one member includes a bottom and top surface defining an airfoil, a core formed by a plurality of cells each defining an acoustic chamber, each of said cells having an opening communicating internally thereof for leading boundary layer air adjacent said airfoil through openings formed in said bottom and top surfaces through said cells and into said air inducing means.

* * * * *